Patented Mar. 14, 1950

2,500,733

UNITED STATES PATENT OFFICE 2,500,733

PROCESS OF PREPARING VINYLDIBENZOFURAN

Royal K. Abbott, Jr., Pittsfield, Mass., assignor to General Electric Company, a corporation of New York No Drawing. Application June 13, 1946,
Serial No. 676,569

3 Claims. (Cl. 260—346)

This invention relates to a method of preparing a vinyldibenzofuran. More particularly the invention is concerned with a method of preparing a vinyldibenzofuran which comprises dehydrogenating an ethyldibenzofuran, specifically by passing an ethyldibenzofuran over a dehydrogenation catalyst at elevated temperatures.

The ethyldibenzofuran for use in the practice of this invention may be prepared, for example, by the methods described and claimed in my copending applications Serial No. 676,568 and Serial No. 676,570 filed concurrently herewith, and assigned to the assignee of the present invention. The method of this invention is applicable to the preparation of any or all of the various isomers of vinyldibenzofuran, the ratio of the various isomers present in the product obtained by this method being determined by the ratio of the isomers present in thte ethyldibenzofuran subjected to dehydrogenation.

A variety of catalysts may be employed such as chrome-alumina, chrome-magnesia, molybdenum-alumina, nickel sulfide, nickel, titania-alumina, and the oxides of aluminum, zinc, titanium, lead, manganese, tungsten, molybdenum, chromium, vanadium, thorium, and magnesium. In order to facilitate passage of the reactant through the catalyst bed, the catalyst advantageously is employed in the form of pellets. Pellets of approximately $\frac{5}{32}$-inch diameter have been found to be satisfactory. However, depending on the rate of flow desired and the size of the equipment involved, it may be desirable to employ pellets of smaller or larger diameter.

In general, the procedure involved in this invention is to pass the monoethyldibenzofuran through a column packed with the above-described catalyst pellets, the column and catalyst being maintained at an elevated temperature. In order to maintain the desired degree of control of the temperature of this column it has been found desirable to divide the column into a number of heater-sections, each with a separate thermocouple and control system.

The ethyldibenzofuran may be passed either upward through the column by distilling from a vessel located at the lower end of the column or it may be passed downward through the column by feeding the liquid ethyldibenzofuran into the top of the column from a reservoir by means of a metering pump. Advantages of the latter procedure will be pointed out in detail hereinafter. When the ethyldibenzofuran is passed upward through the column, a water-cooled condenser and receiver are located at the top of the column. In the descending-flow procedure, the condenser and receiver are situated at the bottom of the column. In both procedures a vacuum pump connected to the receiver is employed to maintain the desired vacuum on the system. It should be realized that arrangements of apparatus other than those described above may be employed in carrying out the method of this invention and that the above arrangements are set forth merely to aid in more clearly describing the invention.

The most satisfactory temperature at which to maintain the column depends to a certain extent on the nature of the catalyst, the length and the diameter of the column and their ratio, the addition rate of the ethyldibenzofuran, and the length of time of contact with the catalyst. However, it has been found that, in general, the dehydrogenation may be carried out at temperatures lying in the range from about 450° C. to 750° C., the preferred temperature being about 600° C. As will be apparent from the examples hereinafter set forth, the best yields of vinyldibenzofuran are obtained when other operating conditions are adjusted to accommodate a column temperature of about 600° C., regardless of the catalyst employed.

It has been found desirable to employ reduced pressures, in the neighborhood of 5 or 6 mm. on the system.

When the ascending flow procedure is employed, the ethyldibenzofuran is distilled at a controlled rate from a vessel at the lower end of the column. As the vapor passes upward through the catalyst, hydrogen is split off and the mixture of unreacted ethyldibenzofuran and vinyldibenzofuran passes into the condenser and then into the receiver. The hydrogen is removed from the system by means of the vacuum pump. Considerable care is required in controlling the rate of distillation in employing this procedure because, as the ethyldibenzofuran reaches the catalyst, hydrogen is evolved, with a resulting increase in pressure in the system. As the pressure increases, the boiling rate of the ethyldibenzofuran decreases until the vacuum can again be restored by the pump, and tthe original boiling rate reestablished.

When the descending flow procedure is used, the liquid ethyldizenzofuran is metered into the top of the column at an absolutely definite, constant, and reproducible rate. The ethyldibenzofuran and its dehydrogenation products pass at an even rate from the top to the bottom of the column under the influence of gravity and assisted by the suction of the pump, without the interruptions such as are incident to the distillation of ethyldibenzofuran into the column in the ascending flow procedure.

In order that those skilled in the art may better understand how to practice the present invention, the following examples are illustrative of the procedure which may be used in the preparation of vinyldibenzofuran:

Example 1

100 gms. of ethyldibenzofuran was placed in a 200 ml. copper vessel surmounted by a steel column ½-inch in diameter and 10 inches long packed with ⅛-inch chrome-alumina catalyst pellets. A water-cooled condenser and a receiver were connected in series with the top of the column, and an oil pump of relatively large capacity was connected to the receiver. A pressure of about 5 mm. was established in the system by means of the vacuum pump and the copper vessel was heated in the neighborhood of 150° C. to 170° C. to distill vapors of the ethyldibenzofuran into the column which was maintained at temperatures varying from 550° C. to 650° C. during the reaction period. The variations in the temperature in the copper vessel and in the column were caused by irregularities in the distillation rate. The material in the receiver, after the ethyldibenzofuran had been completely distilled from the copper vessel, consisted of a mixture of ethyldibenzofuran and vinyldibenzofuran. This mixture was analyzed for vinylbenzofuran by dissolving a sample in benzene and polymerizing the vinyl monomer rapidly by the addition of a small amount of boron trifluoride catalyst. The polymer precipitated and, when weighed, indicated that a yield of 41 gms., or 41 percent of vinyldibenzofuran monomer, had been obtained.

Example 2

100 gms. of ethyldibenzofuran was dehydrogenated in a manner identical to the procedure of Example 1 except that the temperature of the column varied between 715° C. and 770° C. The yield under these conditions was approximately 34 percent.

Example 3

A steel column 1-inch in diameter and 36 inches long, heated in five sections, each with its thermocouple, packed with 5/32-inch chrome-alumina catalyst pellets, and maintained at a pressure of 6 mm. or less by means of an oil pump was employed to determine the effect of the column temperature on the yield of vinyldibenzofuran monomer. The ethyldibenzofuran was metered into the top of the column at a constant rate of 1.5 cc. per minute for each of the determinations, the results of which are set forth in Table I. A condenser was placed beneath the column to cool the distillate quickly and to eliminate polymerization of the monomeric vinyldibenzofuran. This polymerization takes place very readily in an intermediate temperature zone in the neighborhood of 100° C. to 150° C. The products obtained in this series of reactions were clear and light yellow in color. Table I shows the variation in yield with the temperature of the column as determined by the boron trifluoride polymerization test described in Example 1.

Table I

| Column Temperature, °C. | Yield, percent |
|---|---|
| 550 | 42 |
| 563 | 69 |
| 575 | 71 |
| 600 | 62 |
| 650 | 42 |
| 700 | 29 |

Example 4

Employing the same apparatus as that described in Example 3, ethyldibenzofuran was fed to the top of the column packed with 5/32-inch chrome-alumina catalyst pellets, and at a temperature of 585° C., at the rate of 2 cc. per minute. The product from the condenser was filtered through anhydrous sodium sulfate and tested by the boron trifluoride polymerization method to determine the effectiveness of the dehydrogenation. The test indicated a yield of 84 percent of vinyldibenzofuran.

Example 5

The column described in Example 3 was packed with 5/32-inch molybdenum-alumina catalyst pellets and ethyldibenzofuran was metered into the top of the column at a rate of 2 cc. per minute. The temperature of the column was maintained at 600° C. and the pressure in the system at about 5 mm. Analysis of the product passing from the bottom of the column to the condenser and receiver indicated a yield of 67 percent vinyldibenzofuran.

Example 6

Using the descending flow procedure and apparatus described in Example 3, and with the column packed with 5/32-inch titania catalyst pellets, ethyldibenzofuran was metered into the top of the column at a rate of 1.65 cc. per minute. Maintaining this constant rate of flow and a pressure of about 5 mm., several runs were made as shown in Table II, to determine the effect of the column temperature on the yield of vinyldibenzofuran using titania catalyst.

Table II

| Column Temperature, °C. | Yield, percent |
|---|---|
| 550 | 35.8 |
| 600 | 47.7 |
| 650 | 41.1 |

The various isomers or mixtures of isomers of vinyldibenzofuran prepared by the invention as outlined above, may be polymerized or copolymerized with other materials to produce materials that are useful in various industrial applications, for example in the plastics and coating arts and as dielectric materials in the electrical arts. Thus polymers may be prepared from the vinyldibenzofuran monomers as described and claimed in the copending application, Serial No. 567,786, filed December 11, 1944, in the names of Kern, Abbott and Brandow, and copolymers may be prepared as described and claimed in the copending application, Serial No. 567,787, filed December 11, 1944, in the name of Kern, both applications being assigned to the assignee of the present invention.

What I claim as new and desire to secure by Letters Patent of the United States is:

1. The method of producing a vinyldibenzofuran by dehydrogenation of an ethyldibenzofuran which comprises (1) passing said ethyldibenzofuran downwardly through a heated column containing a dehydrogenation catalyst at a temperature of from about 563° to 600° C. under reduced pressure and (2) condensing and isolating the vinyldibenzofuran issuing from the bottom of said column.

2. The method of producing a vinyldibenzofuran by dehydrogenation of an ethyldibenzofuran which comprises (1) passing said ethyldibenzofuran downwardly through a heated column containing a dehydrogenation catalyst comprising chrome-alumina at a temperature of from about 563° to 600° C. under a reduced pressure of 5-6 mm. and (2) condensing and isolating the vinyldibenzofuran issuing from the bottom of said column.

3. The method of producing a vinyldibenzofuran by dehydrogenation of an ethyldibenzofuran which comprises (1) passing said ethyldibenzofuran downwardly through a heated column containing a dehydrogenation catalyst comprising chrome-alumina at a temperature of about 600° C. under a reduced pressure of 5-6 mm. and (2) condensing and isolating the vinyldibenzofuran issuing from the bottom of said column.

ROYAL K. ABBOTT, Jr.

REFERENCES CITED

The following references are of record in the file of this patent:

"Catalysis," by Berkman et al., Published by Reinhold Pub. Corp., N. Y. C., 1940, p. 900 and 901.

Furan and the Alkyl Furans, by Light, page 146. Published by the International Export Chemist, May 1942.